United States Patent [19]

Davis et al.

[11] 4,197,908
[45] Apr. 15, 1980

[54] APPARATUS FOR PORTING A SIDE WALL OF A CONDUIT FROM INTERIORLY THEREOF

[75] Inventors: Edward M. Davis; Richard A. Bowie, both of Fresno, Calif.

[73] Assignee: Underground Surveys Corporation, Fresno, Calif.

[21] Appl. No.: 894,122

[22] Filed: Apr. 6, 1978

[51] Int. Cl.² .............................................. E03F 3/06
[52] U.S. Cl. ..................................... 166/55; 409/143; 409/190; 166/50; 175/77; 175/78; 173/59
[58] Field of Search ...................... 166/50, 55; 175/77, 175/78; 90/12 R, DIG. 8; 173/59; 100/166, 175

[56] References Cited

U.S. PATENT DOCUMENTS

| | | | |
|---|---|---|---|
| 2,971,259 | 2/1961 | Hahnau et al. | 166/250 |
| 3,107,740 | 10/1963 | Cante | 175/78 |
| 3,175,392 | 3/1965 | Tharalson | 175/78 X |
| 3,357,745 | 12/1967 | Cooper | 299/39 |
| 3,357,746 | 12/1967 | Hlinsky | 299/59 |
| 3,464,313 | 9/1969 | Shay et al. | 90/12 R |
| 3,587,194 | 6/1971 | Brown | 51/241 |

*Primary Examiner*—William F. Pate, III
*Attorney, Agent, or Firm*—Huebner & Worrel

[57] ABSTRACT

An apparatus for forming a port in a liner installed in a conduit having a lateral opening inwardly overlaid by the liner so that the port coincides with the lateral opening, including a carriage adjustably positionable longitudinally within the liner adjacent to the lateral opening in the conduit; a brake for locking the carriage in fixed position in the conduit; a power driven port forming tool borne by the carriage in substantial radial relation to the liner for adjustable movement outwardly to liner engagement and inwardly to retraction therefrom, for adjustable movement longitudinally of the carriage, and for adjustable rotational movement about an axis longitudinally of the carriage; control means for controlling the position of the tool on the carriage from a position remote from the carriage; and a television system having a camera mounted on the carriage having a view of the tool and a viewing screen at said remote position.

15 Claims, 12 Drawing Figures

APPARATUS FOR PORTING A SIDE WALL OF A CONDUIT FROM INTERIORLY THEREOF

BACKGROUND OF THE INVENTION

1. Field of the Invention:

It is well known that conduits for water, sewage, and other liquids frequently require repair because of leakage. The leakage may be due to improper formation or installation of the conduit, deterioration due to aging, subjection to acids or corrosive materials, cracking due to earthquakes or vibrations caused by vehicular travel in the vicinity, improper care, or other causes. Whether the leakage is inwardly from an environment into the conduit or outwardly from the conduit into the environment, it is objectionable because of resulting health hazards, waste, damage to the environment and other difficulties. Unfortunately, corrective measures have generally been very expensive, time consuming, and in many instances virtually ineffective.

2. Description of the Prior Art:

Frequently, such conduits are buried deeply in the ground, sometimes tunnel under mountains or other obstructions, and their uncovering for replacement or repair exceedingly expensive. Modernly, it has become possible to line such conduits while they remain in place and without the expenses and hazards of digging them out. For example, U.S. Pat. Nos. 4,009,063, issued Feb. 22, 1977 and 4,064,211, issued Dec. 20, 1977 on a Pipe Lining and a Lining of Passageways, respectively, disclose highly effective procedures for lining conduits in situ.

However, many conduits requiring repair have laterals extended therefrom. This is particularly true in sewage systems where relatively small laterals carry sewage to larger trunk conduits which ultimately lead to sewage processing plants. When a conduit is lined, the lining covers over and shuts off the laterals. Prior to the present invention, it was necessary to gain access to the junctures of the laterals with their trunk conduits and to cut holes through the liners to admit sewage from the laterals into their trunk conduits. This in many instances was a very expensive procedure entailing the digging out of each such juncture, no matter how deeply buried, and no matter of how frequent occurrence as, for example, in a residential area where laterals frequently are within fifteen meters or so of each other.

As will subsequently become apparent, the present invention makes possible the speedy, economical, and effective porting of conduit linings and the like so as to establish fluid communication between a conduit and laterals extended therefrom. Of course, a liner is simply a form of conduit and the present invention is applicable to the lateral porting of other such forms as well.

SUMMARY OF THE INVENTION

An object of the present invention is to provide an apparatus for porting the side walls of conduits from interiorly thereof.

Another object is to make possible the lining of a conduit having lateral conduits extended therefrom and the porting of the lining from interiorly thereof to register with the lateral conduits.

Another object is to provide a side wall porting apparatus for conduits which makes possible the repair of conduits without access to the exteriors thereof.

Further objects and advantages will become apparent in the subsequent description in the Specification.

DESCRIPTION OF THE PREFERRED EMBODIMENT OF THE INVENTION AND A TYPICAL OPERATIONAL ENVIRONMENT

Figure 1:
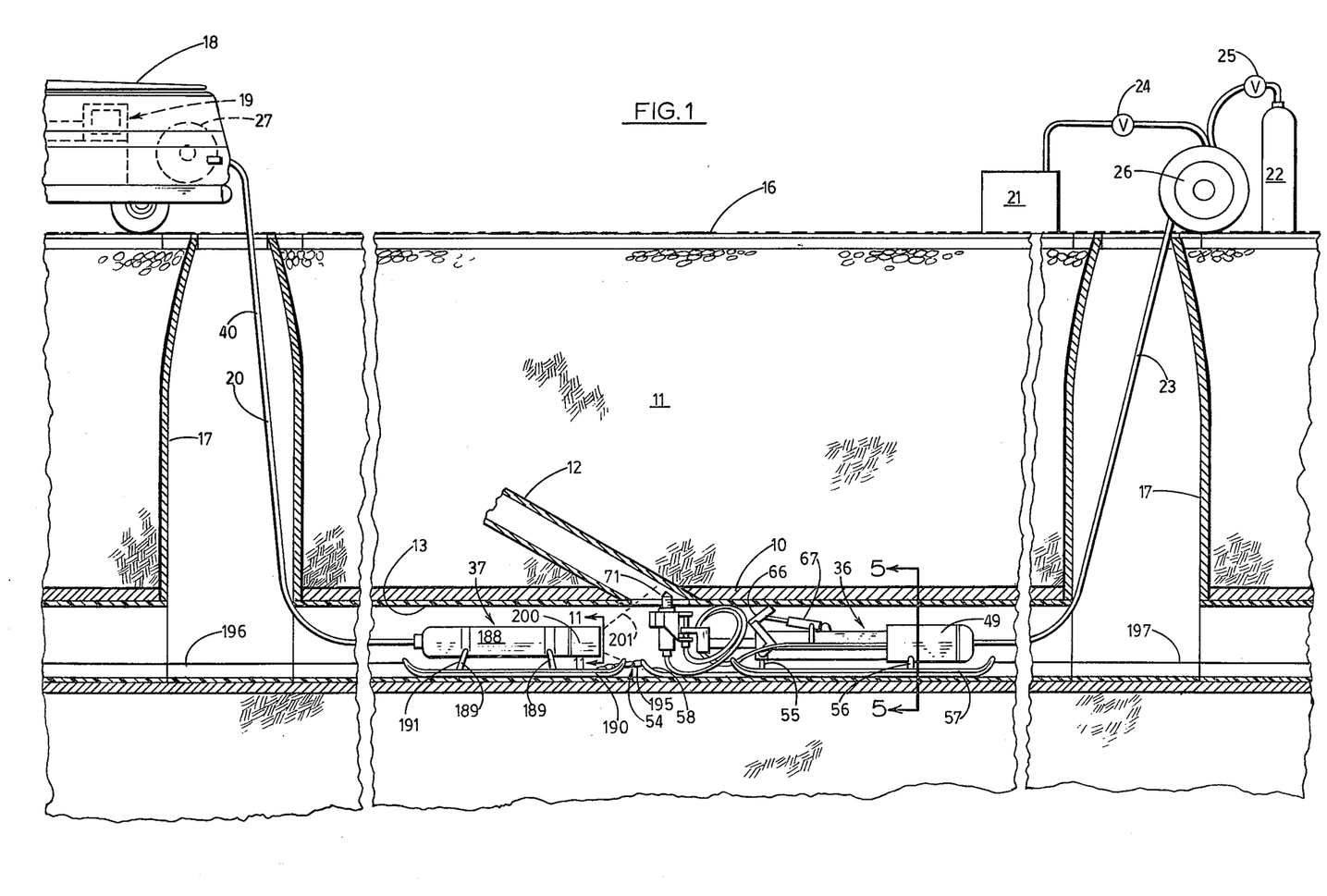
FIG. 1 is a vertical section of a portion of the earth diametrically of a conduit being repaired, and a lateral thereof, showing the apparatus of the present invention in elevation in the conduit and certain supporting apparatus on the surface of the earth for supporting and controlling the porting apparatus of the present invention.

Referring in greater detail to the drawings, a conduit 10, such as a sewer line, is shown buried in the earth 11 and providing at typical lateral 12 obliquely connected to the conduit. To repair the conduit 10, it has had a lining 13 installed therein as by means of the procedures disclosed in U.S. Pat. Nos. 4,009,063 and 4,064,211, referred to above. The conduit 10 and its laterals 12 are normally of clay, cement, cast iron, or other hard and unfortunately frequently brittle material. The lining 13 is normally thinner, less brittle, frequently more chemically resistant, softer and more easily cut or ground, synthetic resin being excellently suited to the purpose. As will subsequently be discussed, the present invention takes advantage of these distinctions.

From the surface 16 of the earth 11 access is had to the conduit 10 through manholes or access openings 17 normally closed by hatch covers, not shown. At the surface 16, adjacent to one of the manholes 17, a truck 18 is provided having a viewing and control console 19 therein. A television cable 20 is connected to the console and extended down the adjacent manhole.

Also at the surface 16 adjacent to a nearby manhole 17 is provided an air compressor 21, a source 22 of inert gas under pressure, a pneumatic hose 23 extended down the adjacent manhole and connected to the compressor 21 through a control valve 24 and to the source 22 through a control valve 25. A reel 26 is provided adjacent to the compressor 21 and source 22 and has the hose 23 wound thereon whereby the hose can be drawn onto the reel or played out from the reel, as desired. Similarly, a reel 27 is provided at the back of the truck 18 and has the cable 20 wound thereon whereby it can be reeled onto the reel or played out therefrom, as desired. While the cable 20 and hose 23 are shown extended down different manholes 17, it will be apparent that they can be extended down the same manhole if desired.

As best shown in FIG. 1, the porting apparatus has a work unit 36 and an inspection unit 37 which, during operation, are located in the liner 13 and conduit 10. The pneumatic hose 23 extends to the work unit. A multiplexing control cable 40 extends from the control console 19 in the truck 18 to the inspection unit 37 and thence to the work unit 36. The control cable is a single conductor and is conveniently combined with the television cable 20 as a single line which can be reeled and unreeled at 27 as an operational convenience.

Figure 2:
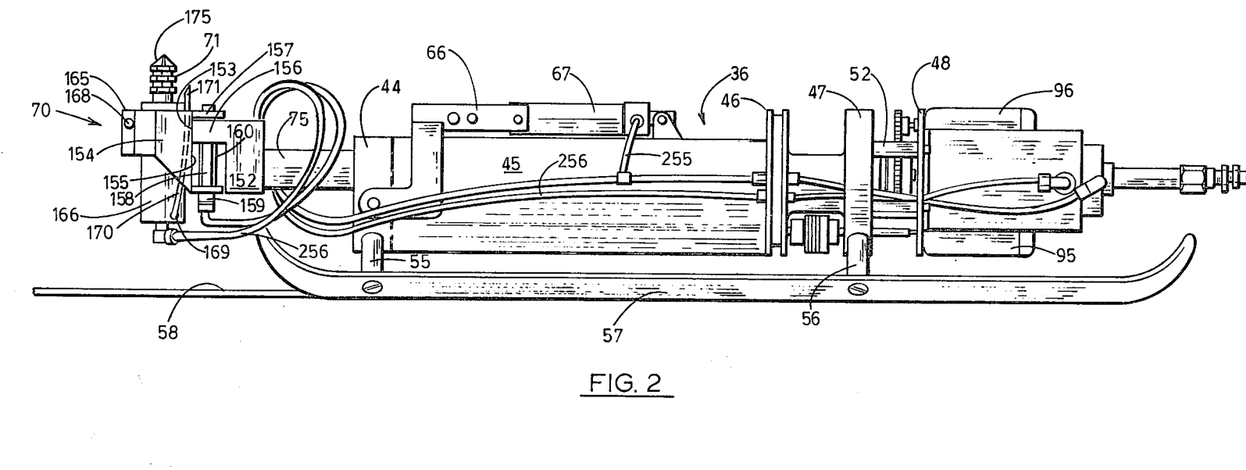
FIG. 2 is a somewhat enlarged, side elevation of a liner cutting portion of the porting apparatus shown in FIG. 1.
Figure 3:
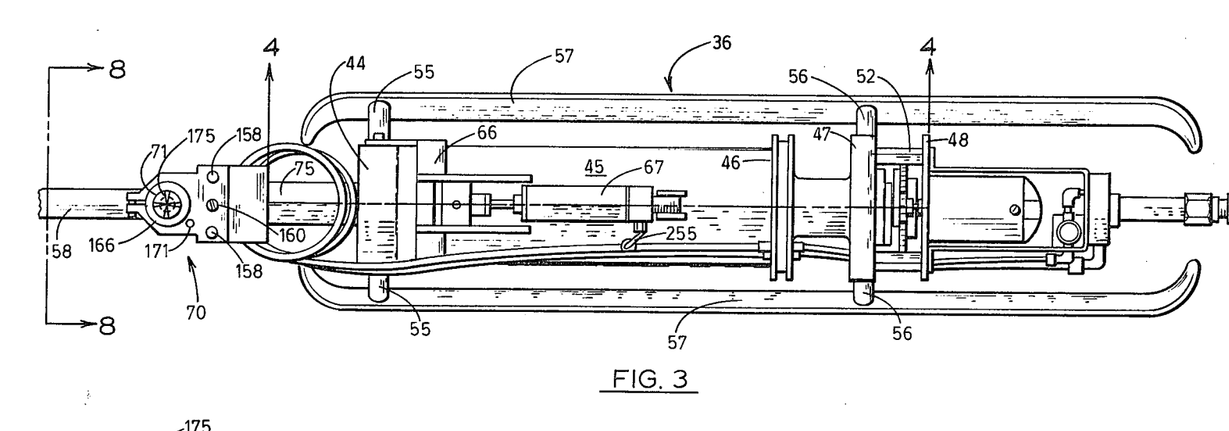
FIG. 3 is a top plan view of the portion of the apparatus shown in FIG. 2.
Figure 4:
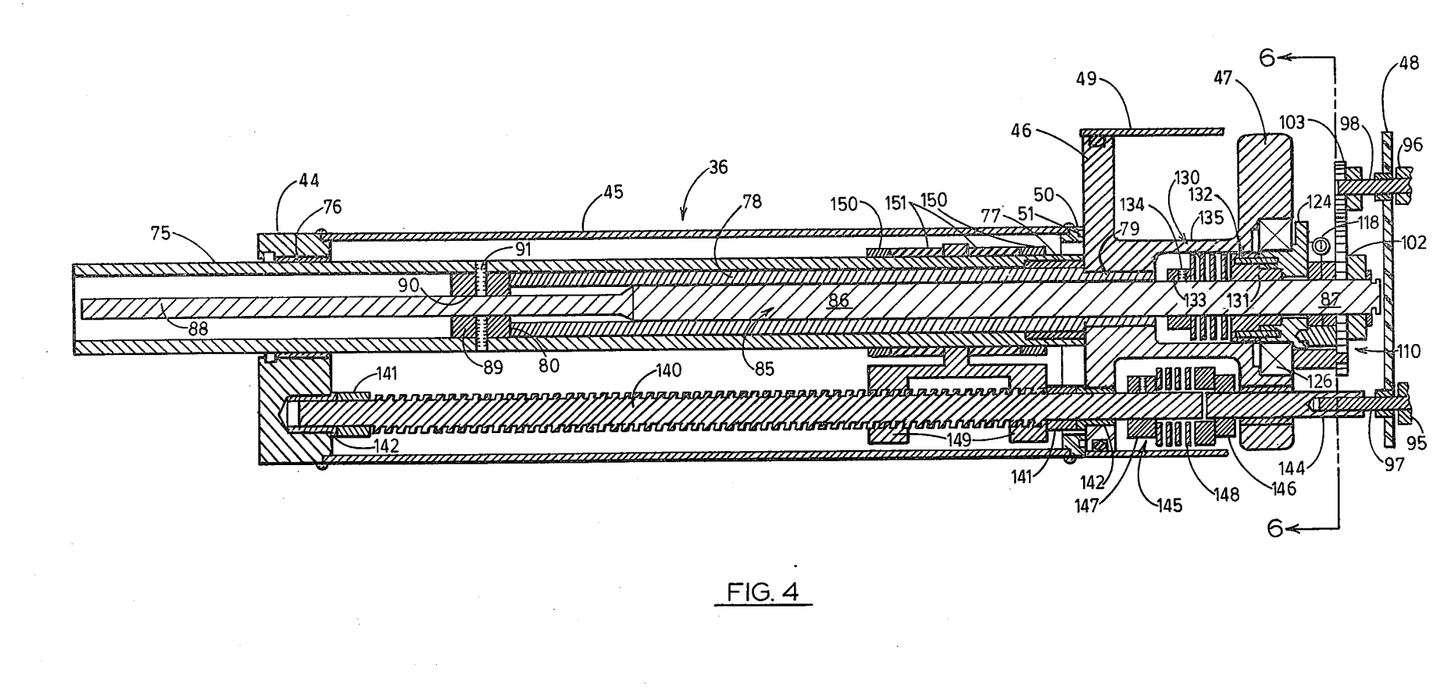
FIG. 4 is a somewhat enlarged section taken on line 4—4 of FIG. 3.

Referring to the work unit 36, as shown in FIGS. 2 through 4, it provides a circular end plate 44, a cylindrical hood 45 concentric to the end plate and welded thereto a pair of circular bearing plates 46 and 47 of integral construction and an opposite end plate 48. The end plate 44 and the hood 45 are of the same outside diameter and are concentrically related. The bearing plates 46 and 47 and the end plate 48 are of the same outside diameter which is substantially greater than the diameter of the end plate 44 and hood 45. By means for purposes soon to be described, the bearing plates 46 and 47 and end plate 48 are preferably concentric to the conduit 10 during operation. A housing 49 is mounted in circumscribing relation on the bearing plates 46 and 47 and the end plate 48 and extends therefrom away from the end plate 44 which is conveniently referred to as the forward direction. The forward end of the hood 45 is preferably welded to an annular forward end plate 50 which is mounted tightly against the rearward side of the rearward bearing plate 46 by setscrews, not shown, with an O-ring 51 compressed therebetween.

As best shown in FIGS. 2 and 4, the forward end plate 48 is mounted in forwardly spaced, concentric, parallel relation on the forward bearing plate 47 by spacers 52 through which bolts 53 are extended and screw-threadably engaged in the bearing plate.

Figure 5:
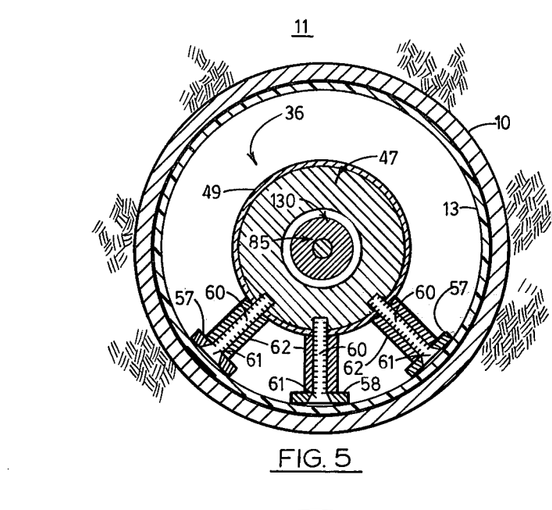
FIG. 5 is a transverse section of the apparatus taken at the position shown by line 5—5 in FIG. 1.
Figure 8:
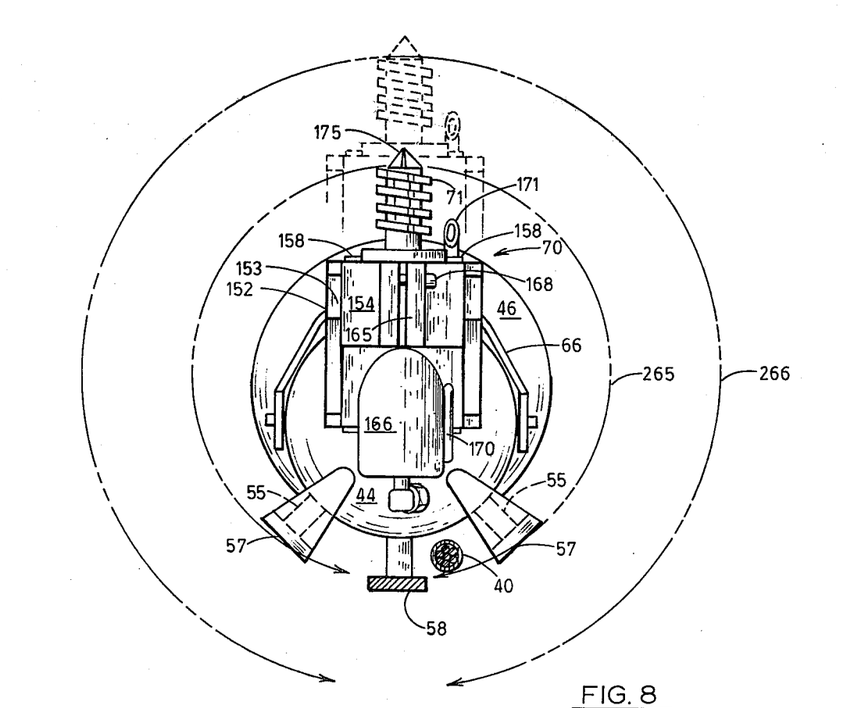
FIG. 8 is an end elevation of a head portion of the apparatus as viewed from line 8—8 in FIG. 3 and demonstrating the azimuth sweep and radial adjustment achieved by a cutting tool in the apparatus.

The work unit 36 and the inspection unit 37 are supported on a carriage 54. The carriage for the work unit includes a pair of rearward legs 55 radially extended from the rearward end plate 44 and a forward pair of legs 56 radially extended from the forward bearing plate 47. Corresponding legs of the pairs of legs 55 and 56 are mounted on skids 57. The legs 55 and 56 support the hood 45 and housing 49 on the skids in substantially parallel relation thereto. As best seen in FIGS. 5 and 8, the legs downwardly diverge from the housing 49, and thus the bearing plates 46 and 47, at approximately 90°. Each leg consists of a bolt 60 screw-threadably mounted in its respective plate 44 or 47 and having a head 61 countersunk in its respective skid 57. A tubular spacer 62 is mounted on each bolt 60 in engagement with its respective plate and skid. As will subsequently become apparent, it is desirable to support the hood 45 and housing 49 concentrically in the conduit 10. Different sizes of conduits are accommodated by the provision of sets of bolts 60 and spacers 62 of lengths predetermined to maintain such concentric relationship.

Optionally the work unit 36 may be mounted on a third skid 58, in the same manner as the skids 57, which extends forwardly of the skids 57 for close coupled connection to the inspection unit 37 subsequently to be described. Such third skid is illustrated in FIGS. 1 through 3, 5, 8 and 9.

During porting operations, it is desirable to lock the work unit 36 in adjusted position in the conduit 10. For this purpose, a substantially Z-shaped bifurcated yoke 66 is pivotally mounted on the rearward end plate 44 for pivotal positioning between a retracted position, as shown in FIGS. 2 and 3 and a locking position as shown in FIG. 1. A control ram 67 pivotally interconnects the hood 45 and the yoke 66 for powered movement of the yoke between its conduit engaging position and its retracted position. The yoke and ram constitute a brake which serves to hold the work unit in fixed position when the brake is actuated.

As best shown in FIGS. 1, 2, and 3, the work unit 36 provides a head 70 having a cutting tool 71 which it is desired precisely to position when the work unit is locked in operating position in the conduit 10. In order accurately to port the liner 13 in registry with the laterals typified at 12, the work unit provides for the adjustable precise positioning of the tool longitudinally along the conduit, rotatably in the conduit, and radially of the conduit to and from linear engagement.

For this purpose, the head 70 is mounted on a hollow cylindrical shaft 75. The shaft is rotatably and slidably mounted concentrically of the bearing plates 46 and 47 by means of a bearing 76 mounted in the rearward end plate 44 and a forward bearing 77 mounted within the shaft, as best illustrated in FIG. 4. The bearing 77 is rotatably and slidably mounted on a tubular support 78 having a forward end press-fit into a bore 79 concentrically in the rearward bearing plate 46. The support extends longitudinally within the shaft 75 and has a rearward end 80 which constitutes a stop. A control rod 85 has a central portion 86 rotatably mounted within the support 78, a forward end portion 87 extended forwardly from the forward bearing plate 47 and a rearward end portion 88 rearwardly extended from the support 78. While the central and forward portions of the rod 85 are cylindrical, the rearward end portion 88 is square in cross-section. A nut 89 having a square passage 90 is slidably mounted on the rearward end portion 88 and rigidly secured in position in the shaft 75 by setscrews 91. So mounted, it will be seen that the tubular shaft 75 can be adjustably linearly positioned by sliding it endwardly along the support 78 on the bearing 77 and through the bearing 76 and rotationally positioned by rotating the rod 85. So that these functions or adjustments can be made remotely from the work unit 36, an electrical linear indexing motor 95 and an electrical azimuth indexing motor 96 are mounted within the housing 49. The linear indexing motor 95 has a linear drive shaft 97 extended through the end plate 48 and the azimuthal indexing motor 96 has an azimuthal drive shaft 98 also extended through the end plate. As best shown in FIG. 4, a driven gear 102 is rotatably mounted on the forward end portion 87 of the rod 85 in mesh with a drive gear 103 mounted on the azimuthal drive shaft 98 for free rotation thereon.

Figure 6:
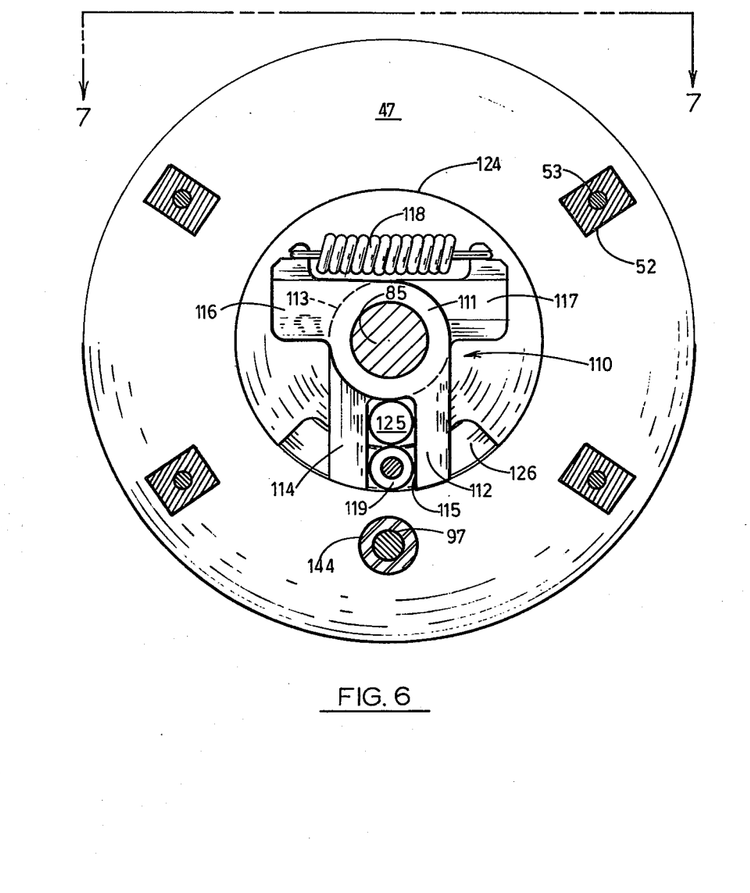
FIG. 6 is a section taken at the position shown by line 6—6 of FIG. 4.

As best shown in FIGS. 4 and 6, a resilient drive linkage 110 is provided on the rod 85 adjacent to the driven gear 102. A forward bearing 111 is rotatably mounted on the rod 85. The forward bearing has an arm 112 tangentially extended therefrom. A rearward bearing 113 is mounted on the rod adjacent to the forward bearing 111 and has an arm 114 extended tangentially therefrom substantially parallel to the arm 112 defining a drive pin receiving channel therebetween. The forward bearing 111 has a spring anchor 116 extended therefrom substantially right-angularly related to the arm 112 and the rearward bearing 113 has an anchor 117 extended therefrom substantially right-angularly related to the arm 114 and oppositely extended from the anchor 116. A tension spring 118 interconnects the anchors 116 and 117. A drive pin 119 is mounted in the driven gear 102 and extended into the channel 115. It will be observed in FIG. 6 that when the drive pin 119 is moved in a counterclockwise direction it engages the arm 112, tensions the spring 118, and urges the anchor 117 resiliently in a counterclockwise direction. Conversely, if the drive pin 119 is moved in a clockwise direction, it engages the arm 114, tensioning the spring 118 to draw the arm 112 in a clockwise direction.

Referring to FIG. 4, a clutch plate 124 is rotatably mounted on the rod 85 adjacent to the rearward bearing 113. A driven pin 125 is extended from the clutch plate 124 into the channel 115. The clutch plate is preferably mounted in the forward bearing plate 47 by means of a roller bearing 126.

A slip clutch 130 has a hub 131 pinned to the clutch plate 124 at 132 and an output hub 133 pinned to the rod 85 at 134. Sandwiched between the hubs are annular friction plates 135. Thus, whenever the drive gear 103 is rotated, it rotates the rod 85 and thus the shaft 75 through the tensioning of the spring 118.

As best shown in FIG. 4, an Acme screw 140 is rotatably mounted in the end plate 44 and the bearing plate 46 in parallel relation to the shaft 75. To preclude axial movement of the Acme screw, stop bushings 141 are rigidly mounted on the screw in endward abutting relation with thrust bearings 142 mounted in the rearward end plate 44 and rearward bearing plate 46. The screw is axially aligned with the linear drive shaft 97 of the motor 95 and a stub shaft 144 rotatably mounted in the forward bearing plate 47 in alignment therebetween. The stub shaft has a forward end connected to the linear drive shaft 97 and a rearward end connected to the Acme screw 140 by means of a slip clutch 145. The slip clutch conveniently provides a hub 146 mounted on the stub shaft and a hub 147 mounted on the screw 140 with slip plates 148 disposed therebetween.

A nut 149 is screw-threadable mounted on the Acme screw 140 and has an annular upward extension slidably fitted about the shaft 75. Stop collars 150 are rigidly mounted on the shaft 75 on opposite sides of the upward extension of the nut 149 and in spaced relation thereto. Sleeve-like cushions 151 of rubber or the like are provided in circumscribing relation to the shaft 75 between the upward extension of the nut and each of the stop collars.

As shown in FIGS. 2, 3 and 8, the head 70 provides a bracket 152 rigidly mounted on the rearwardly extended end of the shaft 75. The bracket has a slide surface 153 disposed in a plane normal to the shaft 75. A carrier 154 provides a slide surface 155 flatly engaged with the slide surface 153. The bracket 152 and the carrier 154 have overlapping ears 156 and 157, respectively, through which a pair of parallel slide pins 158 are extended whereby the carrier is mounted on the bracket for adjustable positioning radially of the shaft 75. A pneumatic ram 159 is mounted on the bracket 152 and has a piston rod 160 slidably extended through the ears 156 and 157 parallel to the pins 158 and disposed therebetween. The piston rod is connected to one of the carrier ears 157 whereby expansion of the ram moves the carrier radially outwardly from the shaft 75 and contraction of the ram draws the carrier inwardly to a retracted position, as illustrated in FIG. 8. Such radial movement is preferably relatively slow and deliberate as well as resilient or yielding if a hard obstruction is encountered. To this end, the ram is supplied with pneumatic pressure and bled of pneumatic pressure through a constriction or orifice, not shown. An orifice approximately 1/100 of an inch in diameter, or the size of a number 80 drill, is excellently suited to the purpose.

Figure 10:
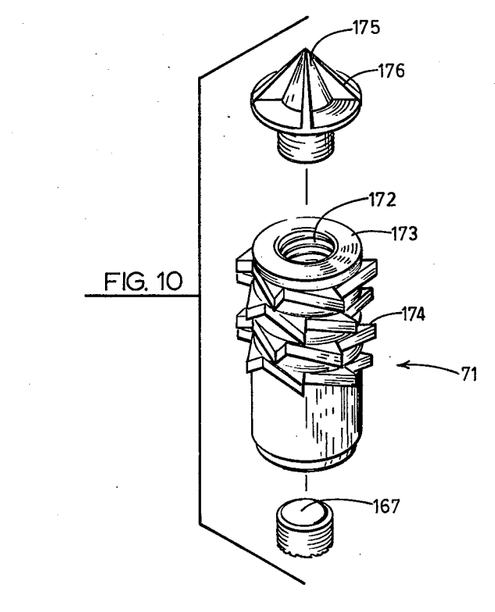
FIG. 10 is an exploded perspective view of a cutting tool used in the porting apparatus.

The carrier 154 provides a split collar 165 adapted to fit about a pneumatic motor 166 having a drive shaft 167 mounting the tool 71 concentrically thereon. The drive shaft is disposed diametrically of the housing 49 and thus diametrically of the conduit 10. A nut and bolt assembly 168 is provided in the collar 165 whereby the collar can be tightened about the motor 166. The motor 166 has an exhaust 169 through which air or gas used to drive the motor is expelled. A conduit 170 is connected to the exhaust, extended alongside of the motor and provided with a discharge 171 directed at the tool. Whenever the motor is being pneumatically driven, air or gas is discharged on the tool 71 to cool the same, to blow away debris caused by tool operation, and, when inert gas is used by opening valve 25 and closing valve 24, to quench any sparks resulting from tool operation. As shown in FIG. 10, the tool 71 has a bore 172 screw-threadably mounted on the drive shaft 167, a concentric cylindrical guide 173 and a toothed portion 174. A disposable piercing point 175 is screw-threadably mounted in the bore and provides endwardly disposed blades 176.

Referring again to FIG. 1, it will be seen that the inspection unit 37 has a cylindrical housing 188 supported concentrically of the conduit 10 on legs 189 supported on skids 190 similar to the skids 57 previously described. The legs preferably take the form of the legs 55 and 56 consisting of replaceable bolts, not shown, circumscribed by spacers 171 which can be replaced so as to adjust the viewing or inspection unit 37 concentrically of the conduit 10. A chain 195 interconnects the forward ends of the skids 190 with the rearward ends of the skids 57. The skids 57 and 190, interconnecting chain 195, and legs 55, 56 and 189 constitute the carriage 54 for the apparatus. A retracting cable 196 is connected to the rearward ends of the skids 190 and extended down the conduit 10 to any convenient manhole or other access opening permitting tensioning of the cable to retract the work unit 36 and inspection unit 37. Similarly, an advancing cable 197 is connected to the forward ends of the skids 57 and extended forwardly down the conduit 10 by any conveniently accessible location for tensioning the cable 197 to advance the work unit and the inspection unit longitudinally along the conduit.

Figure 11:
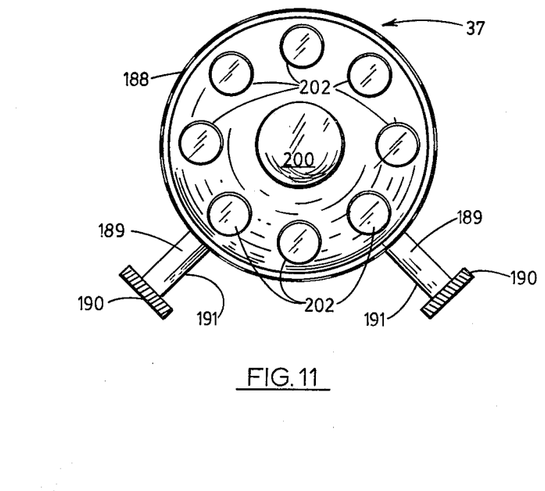
FIG. 11 is a section taken on line 11—11 of FIG. 1.

The cable 20 is connected to a television camera 200 mounted in the housing 188, as shown in FIG. 11, and having a field of view 201 encompassing all adjustable positions of the tool 71, as shown in FIG. 1. Also mounted in the housing 188 is a source of light 202 consisting of a multiplicity of lamps mounted in an annular pattern and positioned to illuminate the field of view 201.

Figure 12:
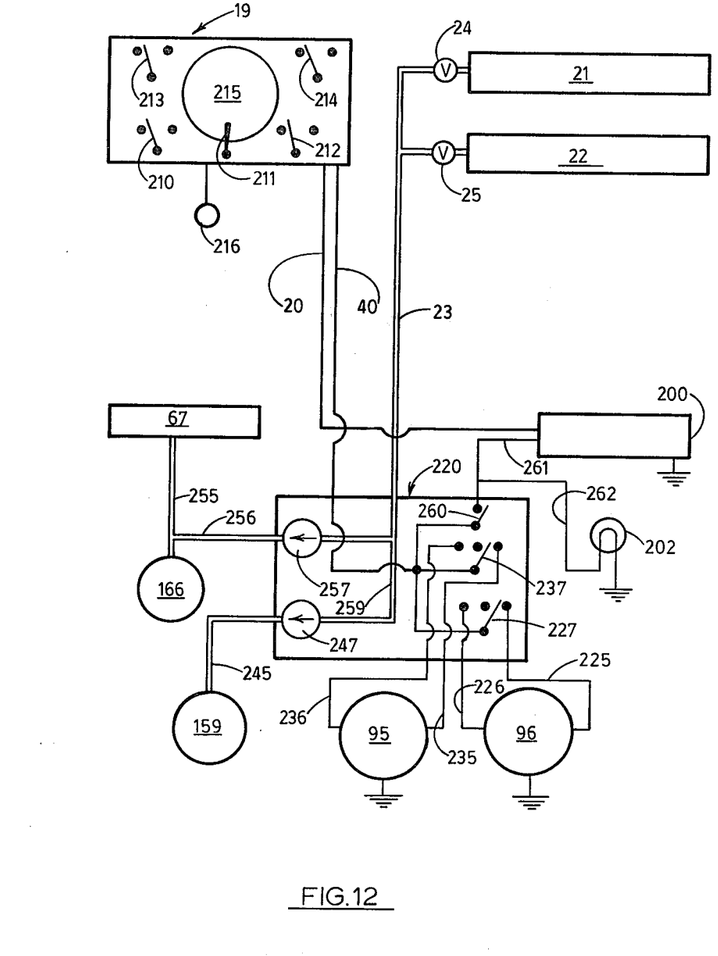
FIG. 12 is a combined schematic electrical and pneumatic diagram of the control and driving systems of the present invention.

The functioning of the work unit 36 and the inspection unit 37 are controlled from the console 19 in the truck 18. As shown in FIG. 12, the console provides a master switch 210, a swivel control stick 211, a television switch 212, a brake switch 213, a tool ram switch 214 and a television screen 215. The switch 210 is connected to a source of alternating current 216 and serves to turn on and off the entire system. The control stick 211 is swivelly mounted and provides for the precision positioning of the head 70 and tool 71 as will become more fully apparent. The switch 212 serves to turn on and off the television camera 200 and lamp 202. The switch 213 controls the operation of both the brake ram 67 and the tool drive motor 166 for simultaneous operation.

As evident in FIG. 12, an electrical telemetry system interconnects the control console 19 and a slave 220 located in the housing 49 by means of the multiplexing cable 40. The telemetry system is of well-known frequency modulation type and is only briefly described at this point. As many tone generators, not shown, are provided in the control console 19 as there are functions to be performed by the slave 220. Each tone generator has its own tone which is responsive to its particular physical signal as received from the swivel control stick 211, the television switch 212, the brake switch 213 or the tool ram switch 214. The swivel control switch is provided with four tone generators, one being responsive to the forward movement of the control switch to move the shaft 75 forwardly, another being responsive to the rearward movement of the control switch to move the shaft rearwardly, a further tone generator is responsive to movement of the switch to the left to turn the head 70 in a counterclockwise direction and a still further tone generator is responsive to movement of the switch to the right to turn the head in a clockwise direction. Alternating current from the source 216 is converted in the console 19 to direct current to operate the slave 220 and is fed to the slave through the cable 40. The outputs of the tone generator are connected to the multiplexing cable 40 which carries the multiplicity of signals of controlling information to the slave 220.

At the slave 220, the signals are segregated in the well-known manner and their respective control signals impressed upon their respective valves and switches to which reference is now made. As shown in FIG. 11, the pneumatic hose 23 is connected to the slave 220 and serves to supply compressed air from the compressor 21 and/or inert gas from the source 22. The azimuth indexing motor 96 is reversible and has opposite sides thereof connected by lines 225 and 226 to a reversing switch 227 within the slave and connected to the cable 40. Similarly, the linear indexing motor 95 is reversible and has opposite sides thereof connected by lines 235 and 236 to opposite sides of a reversing switch 237 within the slave and likewise to the cable 40. As will subsequently be more fully apparent, the swivel switch 211 is interlocked through the telemetry system so as to control the reversing switches 227 and 237 which in turn controls the linear motor 95 and the azimuthal motor 96. The tool positioning ram 159 is pneumatic and is connected by a conduit 245 to a valve 247 which in turn is connected to the hose 23. The ram 159 has an internal spring to contract it whenever the pneumatic pressure is released. The valve 247 has two positions, a first position to pressurize the ram through the hose 245 to advance the tool 71 radially, and a second position to isolate the ram and to bleed the pneumatic pressure thereof to ambient. All the air or gas supplied to the ram 159 and bled therefrom must pass through the orifice previously described giving the ram the slow, deliberate, cushioned action desired. The brake ram 67 and the tool drive motor 166 are connected by pneumatic conduits 255 and 256 to an "On and Off" valve 257 within the slave. Gas under pressure is delivered from the compressor 21 and/or source of gas under pressure 22 to the valves 24 and 25 and the hose 23 to each of the valves 247 and 257 within the slave by an internal hose 259. Not only is each of the valves and each of the switches 227 and 237 controlled by the telemetry system but a switch 260 in the slave 220 is also controlled by the telemetry system and when closed furnishes power to the television camera 200 and light 202 through lines 261 and 262.

It should be understood that the telemetry system provides a separate signal for each of the valves 247 and 257 and each of the switches 227, 237 and 260. For example, if the master switch 210 is closed and the swivel stick 211 pivoted to the right, the azimuth indexing motor 96 is energized to rotate the shaft 75 in a clockwise direction, as viewed in FIG. 8. If the control stick is moved to the left, the indexing motor 96 is reversed to rotate the head 70 in a counterclockwise direction. If the swivel stick is moved forwardly, the linear indexing motor 95 is actuated to rotate the Acme screw 140 to extend the shaft 75 and extend the head 70. If the control stick is moved rearwardly, the indexing motor is reversed and the Acme screw rotated in the opposite direction to retract the shaft 75 and the head 70. When the switch 214 is in one position, it actuates the tool positioning ram 159 radially to extend the tool 71 for engagement with the liner 13. When the switch 214 is in the opposite position, it bleeds the positioning ram 159 to permit the internal spring to retract the tool 71.

Whenever the switch 213 is "on", the telemetry system actuates the valve 257 to supply compressed air or gas to the brake ram 67 and the tool drive motor 166. When the switch 213 is in "off" position, the brake ram is released and the tool drive interrupted.

The swivel switch 211 and the tool ram switch 212 have neutral positions. When the swivel switch is in neutral position, the switches 227 and 237 are in neutral position so that the azimuth motor 96 and the linear motor 95 are held in adjusted position maintaining the head 70 in selected azimuthal position and longitudinal adjustment. When the tool ram switch 214 is in closed position, the valve 247 is closed, no gas passes through conduit 245 and the ram 159 is bled to contract to normal position.

OPERATION

The operation of the described embodiment of the present invention is believed to be readily apparent and is briefly summarized at this point. The diameter of the inside of the liner 13 is determined and legs 55, 56 and 189 selected of such length as to support the work unit 36 and inspection unit 37 on the skids 57 and 190 with the axis of the housing 188 and of the housing 49 coincident with the axis of the liner 13 or approximately thereto. The flexible interconnection of the skids of the carriage 54 by the chain 195 is desirable to permit the units to be inserted into a conduit through manholes 17 or other access openings wherein it is difficult to get the carriage to pass from a nearly vertical manhole 17 to a nearly horizontal conduit 10.

By means of the cable 196 or the cable 197, the porting apparatus is pulled into a position such that the tool 71 is juxtapositioned to a lateral 12. If desired, the cables 196 and 197 can be obmitted and the apparatus pulled back and forth by means of the cables 20 and 40 for retraction and hose 23 for advancement. The switches 210 and 212 are closed and the position of the lateral can be determined by visual reference to the screen 215. When so positioned, the switch 213 is closed to actuate the brake ram 67 and the drive motor 166. It will be noted that whenever the brake is applied, the motor 166 is actuated. The motor preferably operates at approximately 25,000 revolutions per minute and it is desirable to have it up to speed at all times at which it is likely to be utilized. Actuation of the ram 67 locks the work unit 36 in fixed position in the conduit with the inspection unit 37 therebehind having a field of view 201 encompassing the adjustable positions of the tool 71.

Figure 9:
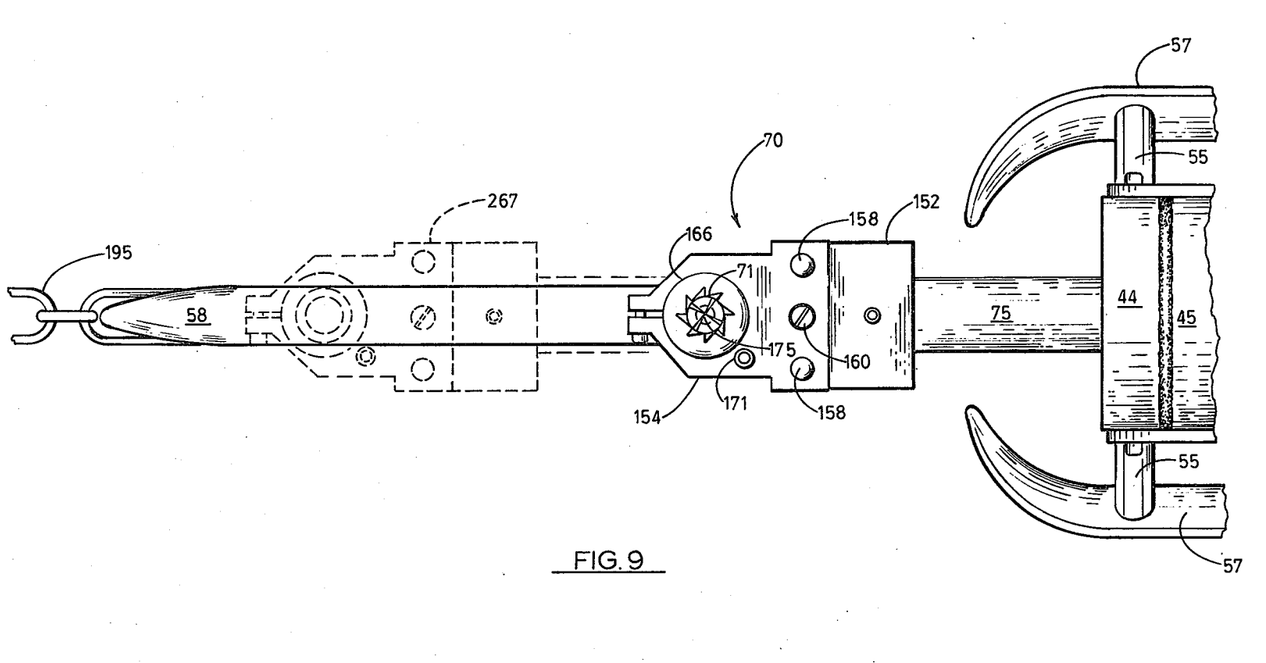
FIG. 9 is a fragmentary, top plan view of a portion of the structure shown in FIG. 3 illustrative of adjustment of a cutting tool longitudinally of the porting apparatus.

The swivel stick 211 is then operated to move the head 70 in precise juxtaposition to the sealed lateral 12. When desired position of the tool is achieved, as determined by visual inspection of the screen 215, the switch 214 is closed to move the tool 71 radially outwardly of the shaft 75 into liner engagement. The extent of radial and azimuthal adjustment of the tool 71 is illustrated in FIG. 8. When retracted, the tool can be precisely disposed at any desired position on the retracted circle 265 except where blocked by the middle skid 58 and/or cable 40 passing between the units 36 and 37. When extended, the tool can be precisely disposed at any desired position on the extended circle 266 except where so blocked. Such adjustment occurs after the work unit 36 is locked approximately in position and affords a wide range of adjustment in a plane normal to the conduit. As shown in FIG. 9, the head 70 can be adjusted longitudinally of the axis of the conduit 10, or of the shaft 75, which coincide within the range between its full line position shown in FIG. 9 or its dashed line position shown at 267.

When precise positioning has been achieved, the portion of the liner 13 overlying the lateral 12 is preferably perforated approximately in its center and by manipulation of the swivel stick 211, the tool 71 caused to make right-angularly related inersecting cuts diametrically of the lateral. Still using the swivel stick 211, the tool 71 is then caused to traverse the inner edge of the opening into the lateral severing the pie-shaped pieces of the liner left by the initial diametric cutting. Such pie shaped sections are normally so small that they are simply discarded in the conduit 10 without difficulty. The cutting action is performed with continuous visual surveilance of the screen 215 in the console 19.

As noted, the conduit 10 and lateral 12 are normally of a hard material which is frequently brittle, such as clay, cast iron or the like. The liner 13 of polymerized synthetic resin or the like is tougher, softer, and more easily cut. To trim the edges of the liner 13 about the opening cut therethrough between the interior of the conduit 10 and the lateral 12, the cylindrical guide 173 is rolled along the edge of the conduit or lateral while the toothed portion 174 meets with and grinds away the edges of the liner.

It will be recalled that the rotational positioning of the tool 71 by the shaft 75 is exerted through the tension spring 118 and the slip clutch 130. The longitudinal positioning of the tool 71 by the Acme screw 140 is exerted through the slip clutch 145 and the annular cushions 151. The radial extension and retraction of the tool 71 is effected pneumatically through the described orifice so that the control is slow, deliberate and resiliently cushioned. Thus, if in remotely controlling the positioning of the tool, the tool encounters a hard unyielding obstruction, the positioning forces are resiliently resisted. This not only minimizes damage to the apparatus but aids greatly in precise guiding of the cutting operation. For example the hard unyielding edge of the lateral can be traversed by the guide surface 173 of the tool 71, or even by the toothed portion 174, by applying a light pressure thereagainst, sufficient to maintain engagement, neatly removing all extraneous portions of the liner, but insufficient to overcome the full resilience of the tension spring 118 or the annular cushions 151 or the resilience of the pneumatic pressure gently supplied through conduit 245 and the described orifice.

The piercing points 175 are readily replaced when worn. Likewise, the entire tool 71 can be replaced when the toothed portion 174 becomes worn.

In some instances, there may be danger of methane gas within the conduit 13 which can be ignited by sparks. If this circumstance prevails, the valve 24 from the compressor 21 is closed and the valve 25 leading from the source of compressed inert gas 22 is opened to feed the inert gas down the pneumatic hose 23 to operate in the normal manner. Such inert gas used to operate the motor 166 is discharged through the conduit 170 into the area of operation of the tool 71 so that any sparks generated by contact with the conduit 10 or laterals 12 are promptly quenched without danger of fire or explosion. Further, whether the inert gas from the source 22 or compressed air from the compressor 21 or a combination thereof is utilized, the exhaust from the motor 166 is directed by the conduit 170 so as to blow away debris caused by the cutting action.

It will be noted that all drive linkages either involve slip clutches, resilient drives or both so that if the tool 71 meets an unyielding obstruction, the drive linkage cushions the resultant shock. For example, the Acme screw 140 and the drive rod 85 are rotated through slip clutches 145 and 130. Further, there is cushioning action between the nut 149 and the shaft 75 incident to the resilient cushions 151 disposed between the upper portion of the nut and the stop collars 150.

Figure 7:
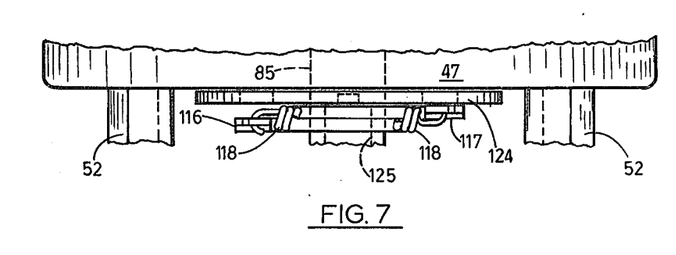
FIG. 7 is a section taken at the position shown by line 7—7 in FIG. 6.

If in rotating the head 70, it meets with an unyielding obstruction, the described drive linkage through the tension spring 118 of FIGS. 6 and 7 in effect stretches to avoid damage. When the opening between the conduit 10 and the lateral 12 is completed through the liner 13, the switch 214 is turned off to retract the tool 71 and the switch 213 turned off to release the ram 67 for retraction of the yoke 66 and to deenergize the motor 166.

The work and inspection units 36 and 37 are then drawn along the conduit 10 by means of the cable 196 or the cable 197. During such movement, the walls of the liner 13 are conveniently examined by the television camera 200 as observed on the screen 215. By such observation, the next lateral to be opened to the conduit can be visually located, the liner tending to bulge inwardly or outwardly at the position of no support caused by the lateral. The work and inspection units 36 and 37 are again drawn into position where the tool 71 is juxtapositioned to a further lateral 12. So approximately positioned, the switch 213 is closed to actuate the ram 67 and start the motor 166. Actuation of the ram again pivots the yoke 66 to lock the work unit 36 in position. The swivel stick 211 is then again operated to bring the tool 71 to the center of the lateral to be opened. When this is achieved, the switch 214 is positioned to extend the ram 159 and cause the tool to perforate the liner and subsequently to cut away the liner about the lateral.

The procedure is continued until all of the laterals within the reach of the television cable 20, control cable 40, and pneumatic hose 23 are opened. When this has been accomplished, the cables 20 and 40 are disconnected from the inspection unit 37 and the hose 23 disconnected from the work unit 36 by means of any suitable connectors, not shown, at the rearward end of the inspection unit 37 and the forward end of the work unit 36. Oceanographic connectors are excellently suited to the purpose. The reels 26 and 27 are then rotated to retract said cables and hoses and the truck 18, compressor 21, source of gas 22, and said cables and hose moved to successive manholes 17 or other access openings where they are reinstalled and again operated in the manner described.

While the operation of the invention has been described in terms of porting the liner 13, it will be obvious that it can be operated to port any type of conduit or liner from interiorly thereof in precise positions desired so long as the material involved is such that the tool 71 can cut or grind therethrough.

The apparatus of the present invention makes possible the porting of liners and other conduits from interiorly while the porting action is continually under surveillance by visual inspection. The excessive expenses previously incurred in digging out the intersections of laterals with newly lined conduits in order to port the liners have been obviated by the apparatus of the present invention. Such laterals need not be dug out and have access openings cut therein to permit porting of such liners which requires the subsequent patching of the openings and filling the holes dug. The liners can conveniently, accurately and economically be ported at the positions of intersection of laterals with trunk conduits, or any other desired position, by access to the interiors of the conduits or the laterals.

While the apparatus of the present invention has been illustrated as utilized to port the liners of conduits at positions of intersection of laterals with such conduits, it may be utilized in porting or interiorly cutting or grinding any pipe, hose, tube or conduit to which internal access is possible and which is susceptible to the action of the tool 71 or any substitute therefor.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. A conduit side wall porting apparatus comprising:
   A. a carriage,
   B. means for positioning the carriage longitudinally internally along such a conduit to successive porting positions,
   C. a power driven port forming tool,
   D. a pneumatic motor having driven connection to the tool providing an exhaust,
   E. means mounting the tool on the carriage for reciprocal positioning transversely of the conduit between an outer conduit engaging position and an inwardly retracted position,
   F. control means connected to the mounting means and operable from a position remote from the carriage selectively to position the tool in conduit engaging position and retracted position,
   G. a source of inert gas under pressure connected to the motor for passage of the gas therethrough and out the exhaust, and
   H. a duct connected to the exhaust of the motor to receive inert gas therefrom and having a discharge directed toward the conduit engaging position of the tool to quench sparks generated thereby.

2. The apparatus of claim 1 including a pneumatic ram having controlling connection to the brake connected to the source of gas, and a control valve connected to the source of gas and having common connection to the motor and to the ram whereby the valve is operable concurrently to actuate the motor and the ram to lock the carriage in the conduit and concurrently to deactivate the motor and the ram to release the carriage for movement to successive porting positions.

3. The apparatus of claim 1 in which the means mounting the tool on the carriage also mounts the tool for adjustable positioning longitudinally of the carriage and rotationally in a plane substantially normal to the conduit.

4. The apparatus of claim 3 in which the control means also is operable from said position remote from the carriage selectively to position the tool longitudinally of the carriage and rotationally in said plane.

5. An apparatus for porting a relatively soft conduit liner installed in a relatively hard pipe having a lateral opening circumscribed by an edge of the pipe and inwardly overlaid by the liner so that the port coincides with the lateral opening, comprising a carriage, means for positioning the carriage longitudinally internally along such a conduit to successive porting positions, a power driven port forming tool, means mounting the tool on the carriage for reciprocal positioning transversely of the conduit between an outer conduit engaging position and an inwardly retracted position, and control means connected to the mounting means and operable from a position remote from the carriage selectively to position the tool in conduit engaging position and retracted position, the means mounting the tool on the carriage having resilient means urging the tool transversely of the conduit as directed by the control means whereby such direction by the control means can be resisted by engagement of the tool with the pipe to overcome the resilient means.

6. The apparatus of claim 5 in which the means mounting the tool on the carriage also has resilient means urging the tool longitudinally of the carriage and rotationally in said plane as directed by the control means whereby such direction by the control means can be resisted by engagement of the tool with the pipe to overcome the resilient means.

7. The apparatus of claim 6 in which the resilient means is of sufficient strength to overcome resistance to cutting action by the tool when engaged with the liner and of such strength as to be substantially overcome by resistance to cutting action by the tool when engaged with the pipe.

8. The apparatus of claim 7 in which the port forming tool is rotatably driven about an axis conforming to the reciprocal positioning of the tool transversely of the conduit and the tool is substantially cylindrical concentrically of the axis having an end adapted to enter the lateral opening, a substantially smooth cylindrical guide portion adjacent to the end disposed to engage the edge of the pipe circumscribing the lateral opening when the point enters the opening and a toothed portion continuous with the guide portion disposed to engage the liner when the guide portion engages the edge of the pipe circumscribing said opening.

9. The apparatus of claim 1 including a television system having a camera mounted on the carriage directed at the conduit engaging position of the tool and a viewing screen disposed at the position at which the control means is operable.

10. An apparatus for porting a substantially horizontal conduit from interiorly thereof comprising:
   A. a carriage;
   B. means for positioning the carriage longitudinally along the interior of such a conduit having a longitudinal axis;
   C. a brake borne by the carriage engageable with the interior of the conduit to lock the carriage in fixed position in the conduit;
   D. a rotary port forming tool having an axis of rotation;
   E. means mounting the tool on the carriage with the axis of the tool substantially radial to the axis of the conduit for adjustably positioning the tool outwardly and inwardly along said axis to and from conduit engagement, for adjustable pivotal positioning of said axis of the tool about the axis of the conduit, and for adjustably positioning the tool longitudinally of the carriage along said conduit;
   F. common powered means controlled from a position remote from the carriage for automatically concurrently actuating the brake and driving the tool whereby the carriage is locked in position whenever the tool is driven; and
   G. controlled means operable from the position remote from the carriage for adjustably positioning the tool to and from conduit engagement, pivotally about the axis of the conduit and longitudinally of the carriage along the conduit.

11. An apparatus for laterally porting a tubular liner for a passageway, which passageway has laterals sealed over by the liner, which laterals it is desired to connect in fluid communication with the interior of the liner, comprising:
   A. a carriage;
   B. means mounting the carriage for movement longitudinally of the liner;
   C. travel control means connected to the mounting means adapted to start and to stop movement of the carriage operable from a control station remote from the carriage;
   D. a television system including a camera mounted on the carriage disposed to view the interior of the liner and a screen at the control station for displaying the interior of the liner as viewed by the camera;
   E. a cutting tool;
   F. a pneumatic motor having driving connection to the tool and having an exhaust port;
   G. means mounting the tool on the carriage for reciprocal positioning between a position engaged with the liner within the view of the camera extended from the carriage transversely of the liner and a retracted position;
   H. tool control means connected to the tool mounting means operable from the control station selectively to position the tool in its extended and retracted positions; and
   I. a duct connected to the exhaust port of the motor having an outlet directed toward the conduit engaging position of the tool to blow debris resulting from operation of the tool therefrom.

12. The apparatus of claim 11 including a source of inert gas under pressure connected to the motor to actuate the motor and by exhaust through the outlet to quench sparks caused by the operation of the tool.

13. A conduit side wall porting apparatus comprising:
   A. a carriage,
   B. means for positioning the carriage longitudinally internally along such a conduit to successive porting positions,
   C. a port forming tool mounted on the carriage for adjustable movement to and from a conduit engaging position,
   D. a pneumatically driven motor connected to the tool having an intake and an exhaust with said exhaust being directed toward said conduit engaging position, and
   E. a source of gas under pressure connected to the intake for passage of the gas through the motor and out the exhaust to said conduit engaging position to blow debris resulting from operation of the tool therefrom.

14. The apparatus of claim 13 in which the source of gas is a source of inert gas which is directed toward said conduit engaging position to quench sparks generated by the tool.

15. An apparatus for porting a relatively soft conduit liner installed in a relatively hard pipe having a lateral opening circumscribed by an edge of the pipe and inwardly overlaid by the liner so that the port coincides with the lateral opening comprising
   A. a carriage,
   B. means for positioning the carriage longitudinally internally along such a conduit to successive porting positions,
   C. a power driven port forming tool, and
   D. resilient control means mounting the tool on the carriage for reciprocal positioning transversely of the conduit between an outer conduit engaging position and an inwardly retracted position whereby movement of the tool outwardly to the conduit engaging position can be resisted by engagement of the tool with the pipe to overcome the resilient means.

* * * * *

UNITED STATES PATENT AND TRADEMARK OFFICE
CERTIFICATE OF CORRECTION

PATENT NO. : 4,197,908

DATED : April 15, 1980

INVENTOR(S) : Edward M. Davis and Richard A. Bowie

It is certified that error appears in the above-identified patent and that said Letters Patent are hereby corrected as shown below:

Column 3, Line 58, after "90°" insert ---.---;

Line 59, before "Each" delete the period;

Column 5, line 48, change "screw-threadable" to

---screw-threadably---.

Signed and Sealed this

Eighth Day of July 1980

[SEAL]

Attest:

SIDNEY A. DIAMOND

Attesting Officer

Commissioner of Patents and Trademarks